J. S. HULL.
Lamp Burner.
No. 39,400. Patented Aug. 4, 1863.
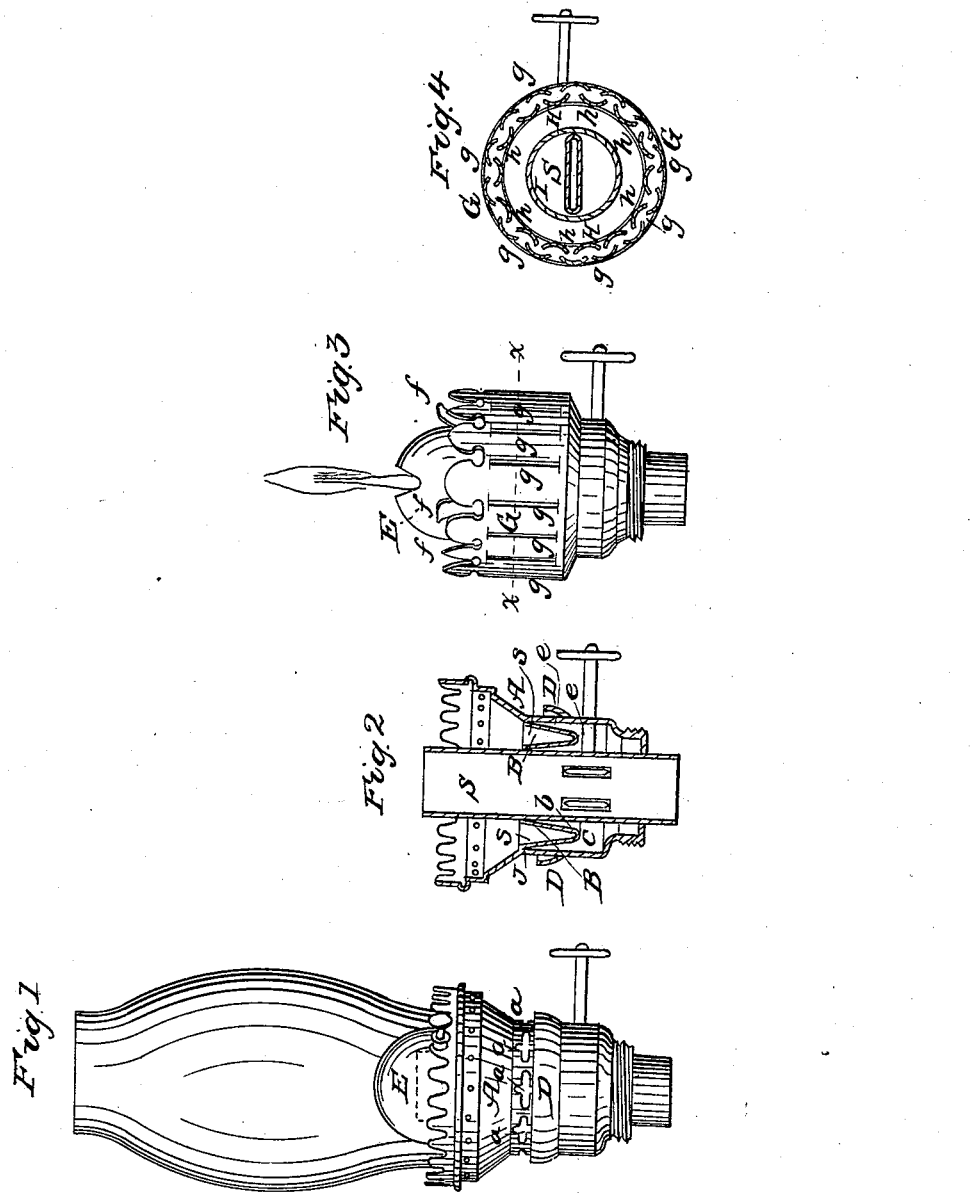

UNITED STATES PATENT OFFICE.

JOHN S. HULL, OF CINCINNATI, OHIO.

IMPROVEMENT IN LAMP-BURNERS.

Specification forming part of Letters Patent No. 39,400, dated August 4, 1863.

*To all whom it may concern:*

Be it known thas I, JOHN S. HULL, of Cincinnati, in the county of Hamilton and State of Ohio, have invented a new and improved lamp-burner for burning coal-oil and other highly carbonaceous oils; and I do hereby declare that the following is a full and exact description thereof, reference being had to the accompanying drawings, making part of this specification.

Figure 1 is a side view of a lamp burner provided with my improvements; Fig. 2, a central vertical section of the same; Fig. 3, a side view of a modification of the improved burner; Fig. 4, a horizontal section of the same in the plane indicated by the line $x\,x$, Fig. 3.

Like letters designate corresponding parts in all of the figures.

As represented in Figs. 1 and 2, my burner has its outer case, A, perforated with apertures $a\,a$ around its periphery, and a considerable distance above its base. Through these apertures the draft-air is introduced into a close chamber, $c$, and first descends therein around a partition, $s$, which generally tapers inward and downward, substantially as shown in Fig. 2. The air then turns around the lower edge of this partition, and thence ascends into an interior "cone," B, which generally forms a continuation of the partition $s$ at the bottom, and closely surrounds the wick-tube S at the top. This interior cone is finely perforated with apertures $b\,b$, Fig. 2, throughout its surface, and through these perforations the air is admitted in fine, equally-distributed streams into the chamber immediately within the burner-cone to supply oxygen to the flame.

The effect of causing the draft-air to descend into a close chamber, and then to ascend through fine perforations, is first to produce a mingling and equalization of the variable outer currents in the said close chamber, and then to distribute this commingled draft still more evenly and gently through the inner perforated cone, B. Thus I obviate the difficulties heretofore experienced in furnishing the proper amount and steadiness of air to the burner, when the lamp is exposed to gusts of wind, or is suddenly moved, so that a good portable lamp is the result, and this with a very short chimney, $i$.

Around the apertures $a\,a$ in the outer case, A, is formed or secured a deep "cup," D, close at the bottom and open at the top, as shown. The upper edge of this cup extends up to or partly around the apertures $a\,a$, and by retaining the descending air directs a sufficient amount into the apertures to supply the draft, even when the lamp is suddenly lifted.

A modification of the descending and ascending director, as above described, is shown in Figs. 3 and 4. Here there are narrow vertical openings $g\,g$ through the outer case, G, approached by the gradual rounding inward of the case itself, on each side of each opening, as clearly seen in Fig. 4, and inside of this case is a corresponding case, H, with similar narrow vertical openings, $h\,h$, therein, but alternating in position with the outer openings $g\,g$, and rounding or turning outward, instead of inward, substantially as shown in said Fig. 4. It is obvious that the currents of air on entering through the openings $g\,g$ will be turned first outward and commingled, and then inward through the openings $h\,h$, in fine equalized streams in a manner analogous to the descending and ascending currents produced in the arrangement first described.

I employ three springs, $f\,f\,f$, Fig. 3, to hold the chimney upon the burner, and these springs not only hold the chimney on, but also the cone, which is separately removable.

What I claim as my invention, and desire to secure by Letters Patent, is—

Introducing the draft-air by first descending from the outside into a separate or inclosed chamber, $c$, and thence ascending through a perforated partition or cone, B, into the burner-chamber, in combination with a flat wick-tube, substantially as and for the purpose herein specified.

JOHN S. HULL.

Witnesses:
J. S. BROWN,
ZENAS CLEMENT.